(No Model.)　　　　　　　　J. DAIN, Jr.　　　　2 Sheets—Sheet 1.
MOWING MACHINE.
No. 495,475.　　　　　　　　　　Patented Apr. 18, 1893.
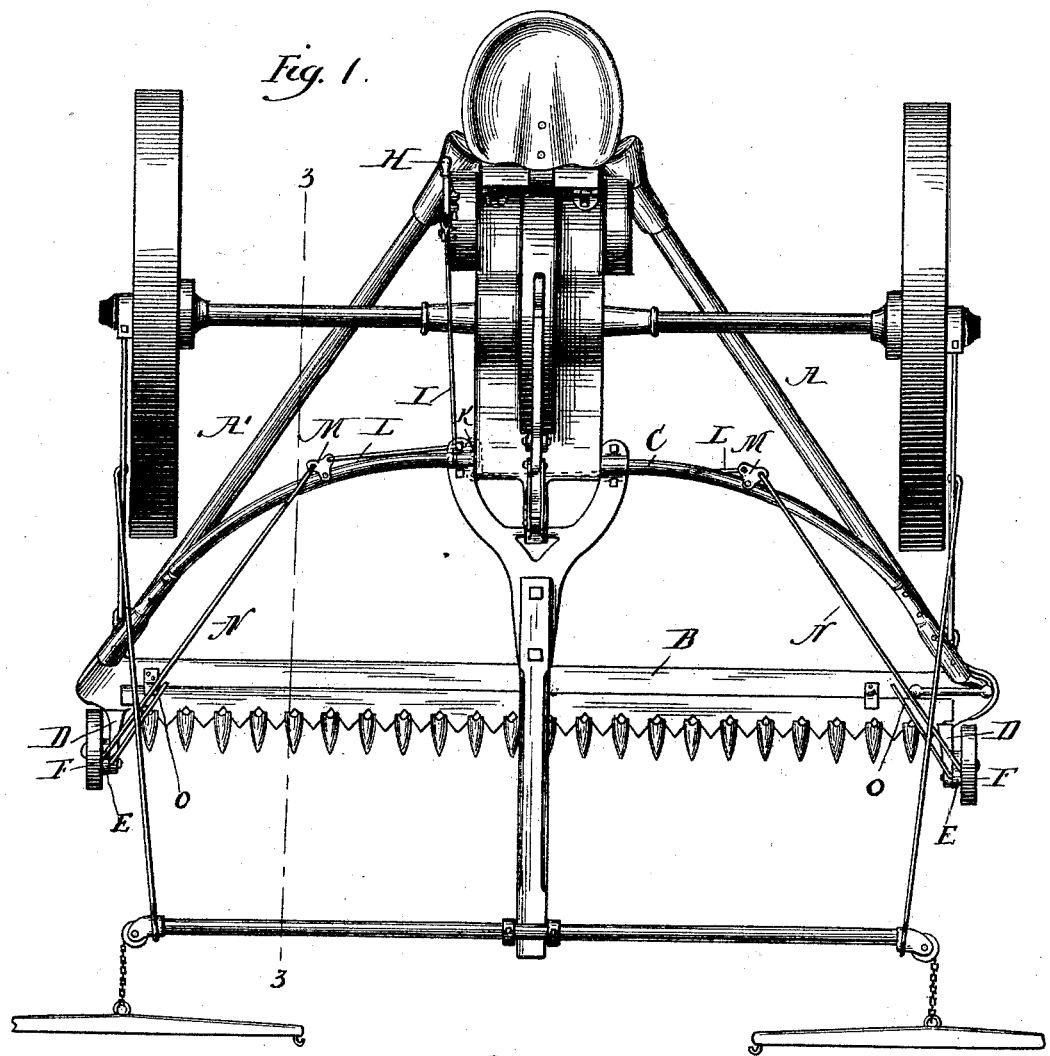
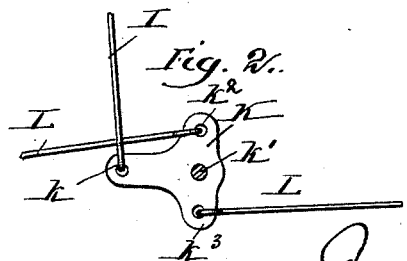
Witnesses.
Nellie McKibben
Ralph Vandyke
Inventor
Joseph Dain, Jr.
by Bond, Adams & Pickard
Attorneys (No Model.)   J. DAIN, Jr.   2 Sheets—Sheet 2.
MOWING MACHINE.
No. 495,475.   Patented Apr. 18, 1893.
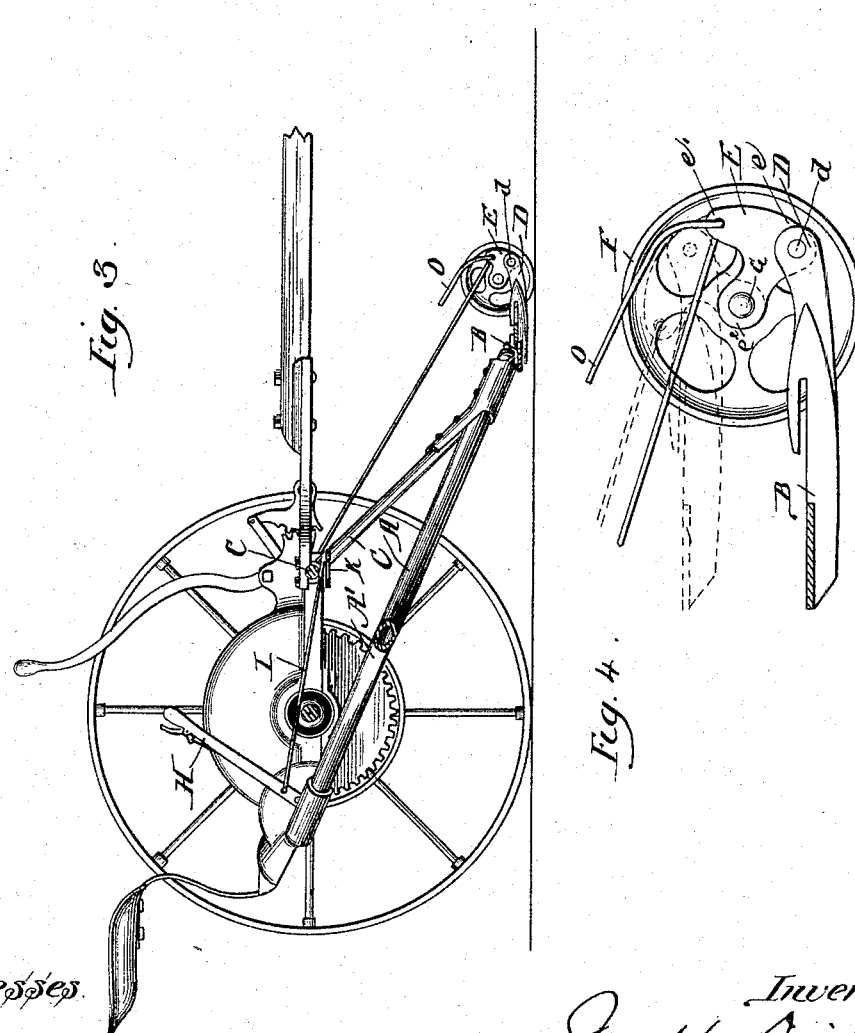

UNITED STATES PATENT OFFICE.

JOSEPH DAIN, JR., OF CARROLLTON, MISSOURI.

MOWING-MACHINE.

SPECIFICATION forming part of Letters Patent No. 495,475, dated April 18, 1893.

Application filed February 23, 1892. Serial No. 422,566. (No model.)

*To all whom it may concern:*

Be it known that I, JOSEPH DAIN, Jr., a citizen of the United States, residing at Carrollton, in the county of Carroll, State of Missouri, have invented certain new and useful Improvements in Mowing-Machines, of which the following is a specification, reference being had to the accompanying drawings, in which—

Figure 1 shows a top or plan view of a mowing machine with my devices applied. Fig. 2 is a detail view of the lever K. Fig. 3 shows a side view of a mowing machine, partly in section, showing my devices attached; and Fig. 4 is an enlarged detail view of the left-hand guide wheel, seen from the inside, showing the attachment of my lifting device to the wheel and finger-bar, and also the grass rod.

My invention relates to mowing machines, and the object is to provide new and improved devices for slightly lifting the finger bar of a mowing machine independently of the main lifting devices. This is desirable in running the machine over rough ground or in tangled grass, or in grass that is more or less fallen, so as to adjust the angle of the cut to the position of the grass, to prevent clogging of the machine, and to make the cut more certain and uniform. I also provide a grass rod for keeping the grass away from the guide wheels, which is simple in construction and efficient in operation.

My invention is designed to be applied to a thrust cut or central draft mowing machine, and in the drawings is shown applied to that class of machines, in which the tube A, carrying the pitman crank shaft, and the corresponding brace tube A' upon the other side, project diagonally forward and downward from the rear of the axle, near the center, to the ends of the finger bar B, with a curved brace C extending from one side to the other, as is best shown in Fig. 1. By proper re-arrangement, however, my invention may be applied to a frame of any other shape.

To a projection D, extending forward from each end of the finger bar B, is pivoted a lifting lever E of irregular shape, as is best shown in Fig. 4, provided with three projections, $e$, $e'$, $e^2$, thus forming what is really a three-way lever. This lever is perforated at each of these three projections,—at the lower forward arm $e$ to receive a bolt $d$ connecting it pivotally to the projections D, D of the finger bar B; at the rear projection $e^2$ to receive the bolt G, upon which is mounted the guide wheel F; and at the upper forward arm or projection $e'$ to receive the device for lifting, which is hereinafter described. The guide wheels F, F are supported by the rearward projecting arm $e^2$ of the lever E, by means of the bolts G which are mounted in said arms, said wheels being outside of the lifting lever E.

To the frame of the mowing machine, preferably in front of and at the right of the seat occupied by the driver, and within easy reach, at about the point shown in Fig. 1, is attached the operating lever H, provided with a suitable rack, with spring and dog attachments, for holding it in the required position. To this lever is attached a rod I, connecting the lever H with the three armed lever K, at the point $k$. The lever K is pivoted to the under side of the brace C, at a point directly in front of the lever H, or nearly so, by means of the pin $k'$ shown in Fig. 2; the other arms $k^2$ and $k^3$ of the lever K carry the connecting rods L, L, which engage with the triangular shaped levers M, M at the inner rear point of the triangle, the forward point being pivoted to the brace C and above it, as shown in Fig. 1, at about the point there shown; the other point having inserted into it the rod N, one to each lever. The rods N, N project forward and downward diagonally to the upper front point or arm of the lever E, passing through the hole in said point from without inwardly. The respective lower ends of the rods N, N, after passing through the lever E as described, are bent first upward and then diagonally backward and inward, forming guides or grass rods O, O, which serve to direct the grass away from the guide wheels.

The extension of the rods N upward and diagonally rearward to form the grass-guides O, is advantageous in that these grass-guides are integral with the rods and therefore cannot be worked loose by the vibrations of the machine, as is the case where grass-guides are bolted in position. Ordinarily grass-guides are secured by bolts and work loose and further the vibrations of the machine will either crystallize the iron so that it breaks off, or the bolt will give away, whereas in my construction the rods N are held taut by the weight of the finger bar and consequently these rods have no tendency to crystallize by the vibrations of the machine, and as there are no bolts to work loose the grass guides remain permanent fixtures and are superior to grass guides bolted in place.

The operation of the lifting device is as follows: When the lever H is thrown back, the motion is communicated by means of the rod I and the lever K to the rods L, L, thence through the triangular pieces or levers M, M to the rods N, N and thus to the lever E, drawing the point $e'$ upward and backward and lifting with it the finger bar and frame, as shown by the dotted lines in Fig. 4.

That which I claim as my invention, and desire to secure by Letters Patent, is—

1. The combination with the frame of a mowing machine, and a finger-bar, of lifting levers E pivotally connected with the finger-bar and carrying guide-wheels F, rods N secured to the lifting levers and having their front end portions bent upward and diagonally rearward to form grass guides O, and a lever H connected with said rods, substantially as described.

2. The combination with the frame of a mowing machine, and a finger-bar, of lifting levers pivotally connected to the finger-bar and carrying guide-wheels, rods N secured to the lifting levers and having their front end portions formed integral with grass guides O, and a lever H connected with said rods, substantially as described.

3. In a thrust cut mowing machine, the combination with a frame, and a finger-bar B, of lifting levers E pivotally connected to the extremities of the finger-bar and provided with axles carrying guide wheels F, the connected rods N engaging the lifting levers, the triangular levers M mounted on the frame and secured to the connected rods, the three-armed lever K provided with rods L connected with the triangular levers, and a lever H having a rod connection I with the three-armed lever, all combined substantially as described, for lifting the finger-bar at both extremities.

JOSEPH DAIN, JR.

Witnesses:
JOHN L. JACKSON,
CHARLES E. PICKARD.